United States Patent
Sohn (10) Patent No.: US 8,195,954 B2
(45) Date of Patent: Jun. 5, 2012

(54) SMART CARDS INCLUDING SEPARATE CLOCKS FOR KEY PROCESSING AND NON-VOLATILE MEMORY INTERFACE COMMUNICATIONS AND METHODS OF OPERATING THE SAME

(75) Inventor: Keon-Han Sohn, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 1376 days.

(21) Appl. No.: 11/769,337

(22) Filed: Jun. 27, 2007

(65) Prior Publication Data

US 2008/0189555 A1    Aug. 7, 2008

(30) Foreign Application Priority Data

Feb. 6, 2007    (KR) .................. 10-2007-0012201

(51) Int. Cl.
*G06F 21/00* (2006.01)

(52) U.S. Cl. ........ 713/189; 713/322; 713/375; 713/400; 713/500; 713/190; 713/191; 713/192; 713/193; 713/194; 380/35; 380/274; 365/233.1; 365/233.11; 365/233.12

(58) Field of Classification Search .................. 713/400, 713/500, 501, 322, 375, 401, 189–194; 726/26–30; 711/163–164; 380/274, 35
See application file for complete search history.

(56) References Cited

U.S. PATENT DOCUMENTS

| | | | |
|---|---|---|---|
| 5,239,639 A | 8/1993 | Fischer et al. | |
| 5,448,715 A | 9/1995 | Lelm et al. | |
| 5,815,692 A | 9/1998 | McDermott | |
| 5,923,759 A * | 7/1999 | Lee | 713/159 |
| 6,092,210 A * | 7/2000 | Larky et al. | 713/400 |
| 6,327,661 B1 * | 12/2001 | Kocher et al. | 713/193 |
| 6,424,688 B1 * | 7/2002 | Tan et al. | 375/354 |
| 6,480,072 B1 * | 11/2002 | Walsh et al. | 331/78 |
| 6,954,133 B2 * | 10/2005 | McGregor et al. | 340/5.26 |
| 7,127,620 B2 | 10/2006 | Boeckeler | |
| 7,574,635 B1 * | 8/2009 | Alfke | 714/719 |
| 2003/0174543 A1 * | 9/2003 | Nagai et al. | 365/189.05 |
| 2004/0139363 A1 * | 7/2004 | Elbe et al. | 713/400 |
| 2004/0215996 A1 | 10/2004 | Kanamori et al. | |
| 2006/0215469 A1 | 9/2006 | Kikuchi et al. | |
| 2006/0289659 A1 * | 12/2006 | Mizushima | 235/492 |
| 2007/0058480 A1 * | 3/2007 | Hwang | 365/233 |
| 2007/0211557 A1 * | 9/2007 | Kim et al. | 365/233 |

FOREIGN PATENT DOCUMENTS

JP    2003-241908 A    8/2003

OTHER PUBLICATIONS

Andre Abrial et al. NPL document "A new Contactless Smart Card IC Using an On-Chip Antenna and an Asynchronous Microcontroller", Jul. 2001, IEEE Journal of Solid-State Circuits, vol. 36, No. 7.*

* cited by examiner

*Primary Examiner* — Taghi Arani
*Assistant Examiner* — Josnel Jeudy
(74) *Attorney, Agent, or Firm* — Myers Bigel Sibley & Sajovec, P.A.

(57) ABSTRACT

A memory controller for a smart card including a non-volatile memory can include an internal circuit that is configured to perform cryptographic key processing responsive to a first clock and a non-volatile memory interface circuit for transferring/receiving a signal to/from the internal circuit in synchronization with the first clock and transferring/receiving the signal to/from an external device in synchronization with a second clock that is asynchronous relative to the first clock.

22 Claims, 7 Drawing Sheets

SMART CARDS INCLUDING SEPARATE CLOCKS FOR KEY PROCESSING AND NON-VOLATILE MEMORY INTERFACE COMMUNICATIONS AND METHODS OF OPERATING THE SAME

CROSS-REFERENCE TO RELATED APPLICATIONS

This U.S. non-provisional patent application claims priority under 35 U.S.C. §119 of Korean Patent Application No. 2007-12201, filed on Feb. 6, 2007, the entire contents of which are hereby incorporated by reference.

FIELD OF THE INVENTION

The present invention relates to memory devices, and more particularly, to security for smart cards.

BACKGROUND

What has been developed is a cryptoanalysis method for detecting secret data, such as a secret key, by measuring power or time consumed during an arithmetic operation of a cryptographic algorithm. Leakage of secret data for a cryptographic algorithm is sometimes called a "side channel", and attacks via the side channel are sometimes called "side channel attacks". The side channel attack can be broadly classified into a timing attack, a fault insertion attack, and a power analysis attack.

Figure 1:
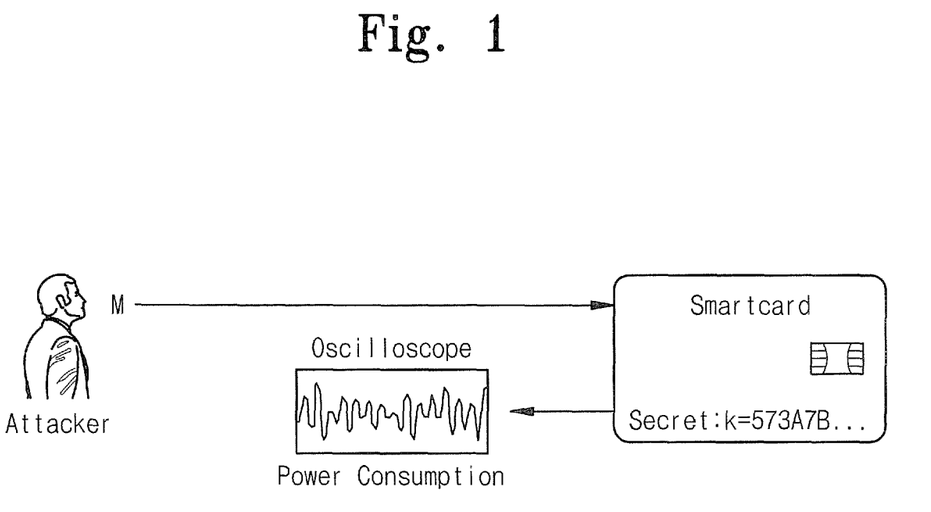
FIG. 1 is a schematic block diagram of a general cryptosystem.

FIG. 1 is a schematic block diagram of a general cryptosystem, which illustrates an example of the power analysis attack. Referring to FIG. 1, upon activation of a cryptographic secret key built in a low-power device such as a smart card, an attacker reads a variety of binary code data by detecting an instantaneous voltage (or power) change in an IC chip that is generated from the smart card. The power analysis attack is broadly classified into a simple power analysis (SPA) attack and a differential power analysis (DPA) attack. An SPA attack scheme detects the power consumption of a cryptographic processor operated in a smart card to directly attack a secret key in the smart card. Unlike the SPA attack scheme, a DPA attack scheme uses stochastic analysis and error correction to extract data with an accurate correlation to a secret key from collected power consumption data. In particular, the DPA attack scheme can estimate a secret key merely by using voltage detectors such as an oscilloscope. In addition, the DPA attack scheme can perform not only analysis of important data but also forgery using stochastic analysis.

SUMMARY

In some embodiments according to the present invention, a memory controller for a smart card including a non-volatile memory can include an internal circuit that is configured to perform cryptographic key processing responsive to a first clock and a non-volatile memory interface circuit for transferring/receiving a signal to/from the internal circuit in synchronization with the first clock and transferring/receiving the signal to/from an external device in synchronization with a second clock that is asynchronous relative to the first clock.

BRIEF DESCRIPTION OF THE DRAWINGS

The accompanying figures are included to provide a further understanding of the present invention, and are incorporated in and constitute a part of this specification. The drawings illustrate exemplary embodiments of the present invention and, together with the description, serve to explain principles of the present invention. In the figures.

DESCRIPTION OF EMBODIMENTS ACCORDING TO THE INVENTION

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As used herein, the term "asynchronous" means that two or more events or clock signals can have different start/stop times (such as clock edges) and can have different frequencies and duty rates. Asynchronous clocks can be generated from a base clock signal where, for example, one of the clocks can be processed to introduce an asynchronous relationship with the other clocks. For example, an asynchronous clock can be generated using spread-spectrum clocking of a base clock to offset the edges of the asynchronous clock in-time relative to the base clock. For example, the spread-spectrum clocking can use pseudo-random number generators to introduce pseudo-randomly selected delays to the asynchronous clock.

Figure 2:
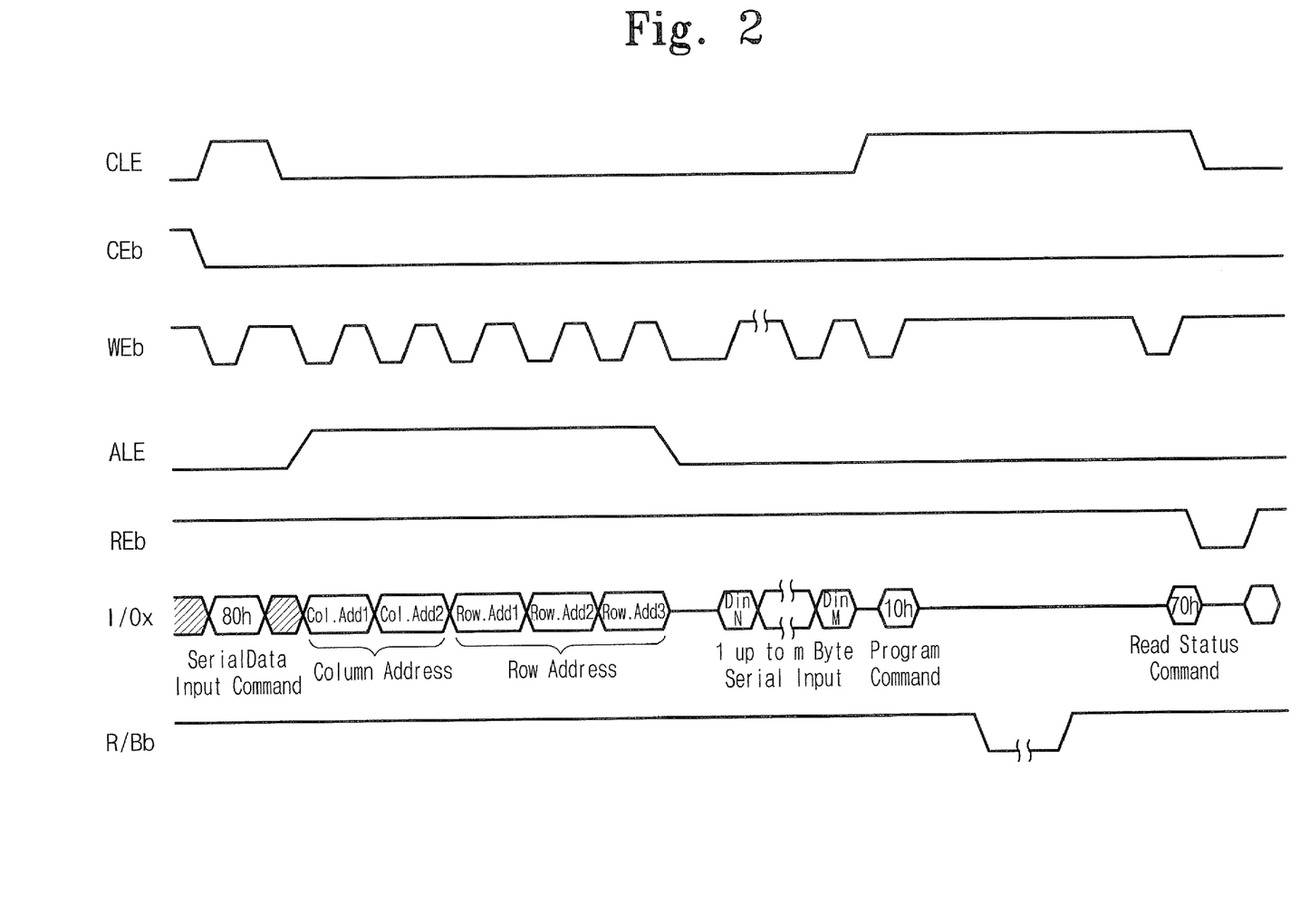
FIG. 2 is a timing diagram illustrating a program operation of a NAND flash memory.
Figure 3:
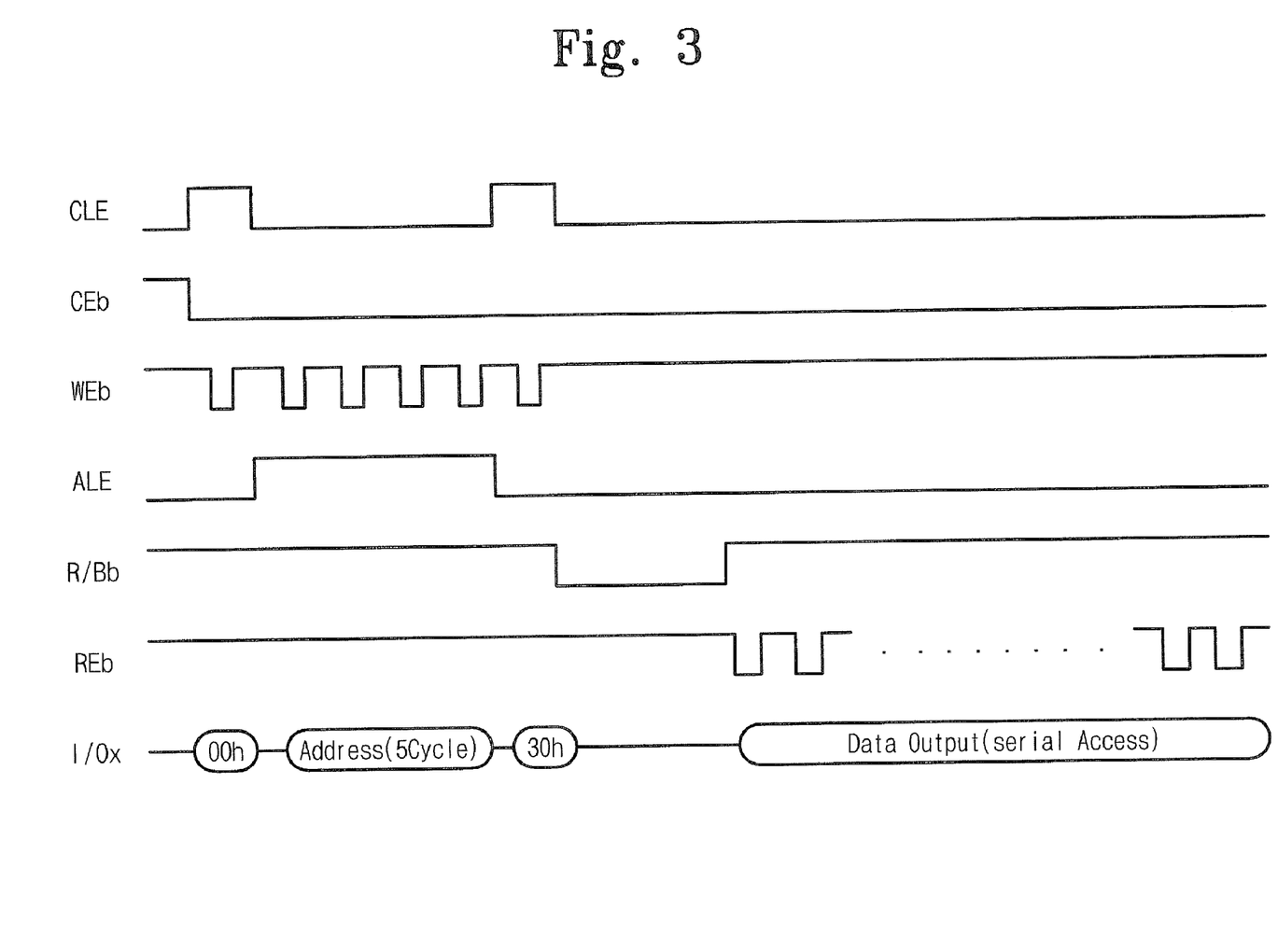
FIG. 3 is a timing diagram illustrating a read operation of a NAND flash memory.

FIG. 2 is a timing diagram illustrating a program operation of a general NAND flash memory. FIG. 3 is a timing diagram illustrating a read operation of a general NAND flash memory. Referring to FIGS. 3 and 4, the NAND flash memory has a plurality of I/O pins. A CLE (Command Latch Enable) pin is used to control activation of commands stored in a command register. A CEb (Chip Enable bar) pin is used to enable a device (i.e., the NAND flash memory). A CEb signal is activated at a low level.

An REb (Read Enable bar) pin is used to control serial data-out. The REb pin is enabled at a low level. The REb pin is used to activate a signal for output of data from the NAND flash memory. The signal activated by the REb pin has the same waveform as a clock.

A WEb (Write Enable bar) pin is used to control a write operation for I/O ports. The WEb pin is used to activate a signal for input of data into the NAND flash memory. The signal activated by the WEb pin has the same waveform as a clock.

An ALE (Address Latch Enable) pin is used to enable an address path of an address register. An I/Ox (Data inputs/Outputs) pin is used to input/output of commands, addresses, input data, and output data.

An R/Bb (READY/BUSY Output) pin is used to indicate the current status of the device. When an R/Bb pin signal is at a low level, the NAND flash memory is under a program operation, an erase operation, or a random read operation. When the R/Bb in signal is at a high level, it indicates the completion of an ongoing operation.

During the program operation of the NAND flash memory, a WEb pin signal is toggled with a clock. During the read operation of the NAND flash memory, an REB pin signal is toggled with a clock.

Accordingly, as appreciated by the present inventors, during the program or read operation of the NAND flash memory, a toggle period of the WEb pin and REb pin can indicate a clock period of a memory controller of the NAND flash memory. Therefore, if the clock period of the memory controller is exposed, it facilitates a power analysis attack from an attacker.

Figure 4A:
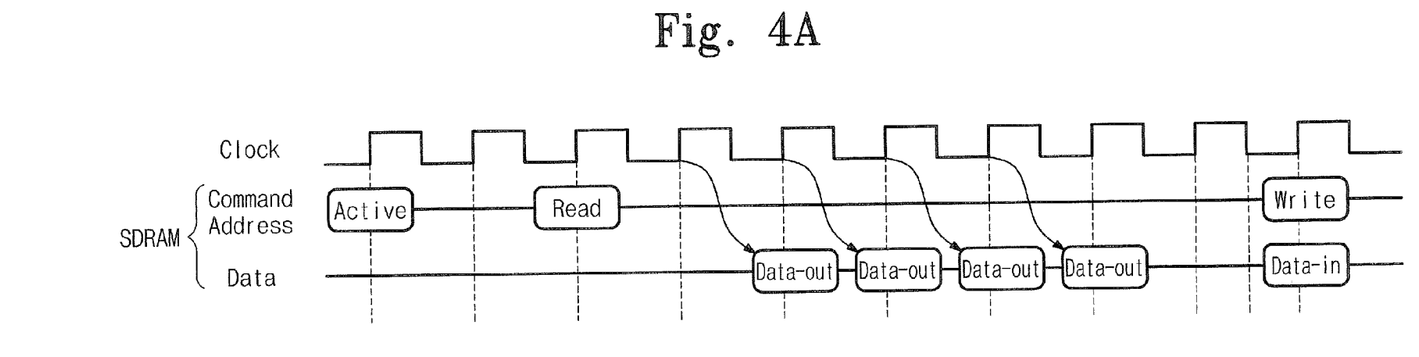
FIG. 4A is a timing diagram illustrating a read/write operation of an SDRAM.
Figure 4B:
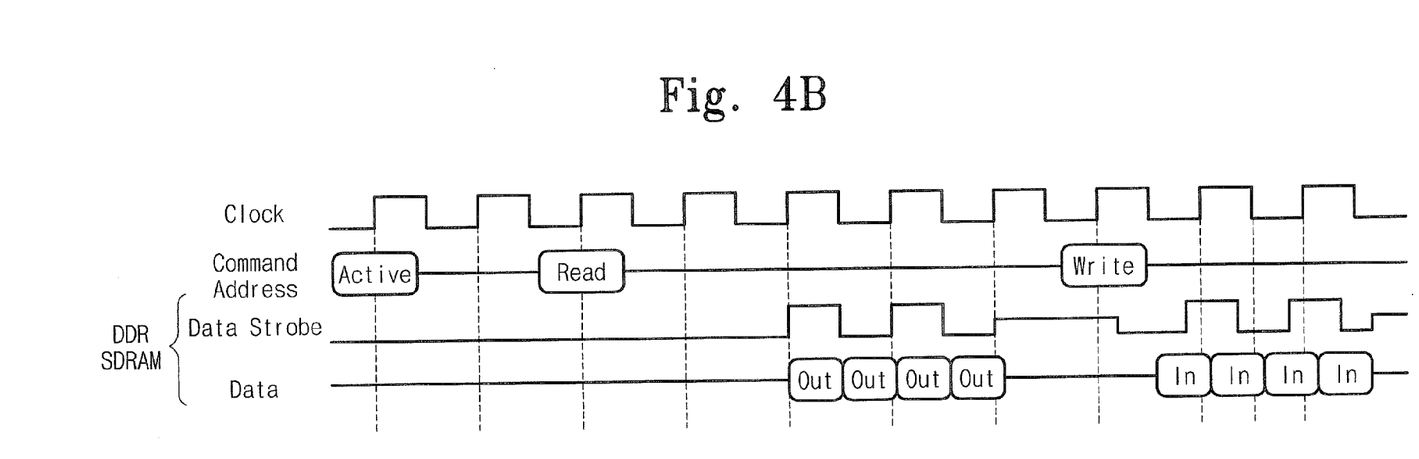
FIG. 4B is a timing diagram illustrating a read/write operation of a DDR SDRAM.
Figure 4C:
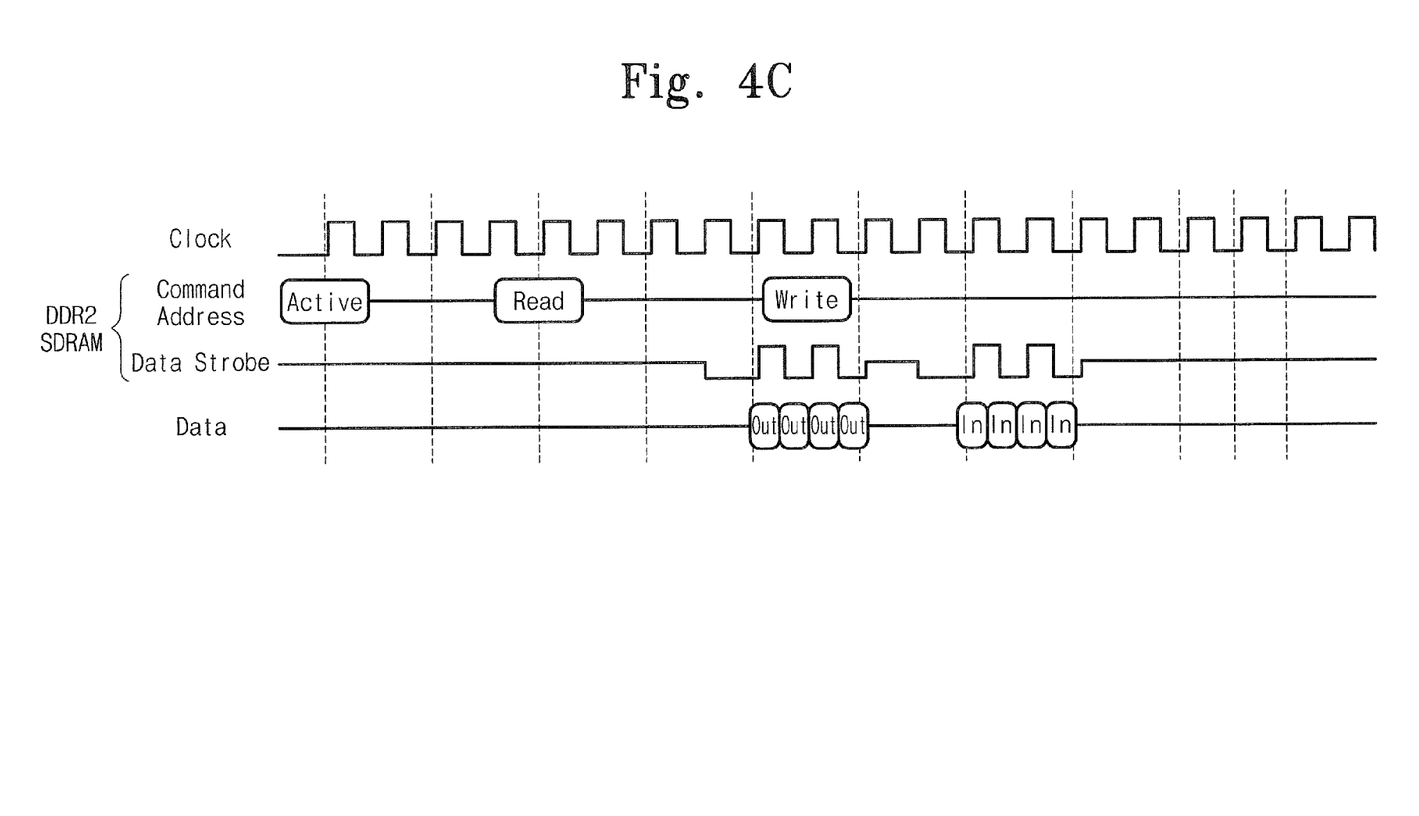
FIG. 4C is a timing diagram illustrating a read/write operation of a DDR2 SDRAM.

FIG. 4A is a timing diagram illustrating a read/write operation of a general SDRAM. FIG. 4B is a timing diagram illustrating a read/write operation of a general Double Data rate (DDR) SDRAM. FIG. 4C is a timing diagram illustrating a read/write operation of a general Double Data rate 2 (DDR2) SDRAM.

Referring to FIGS. 4A through 4C, the SDRAM outputs or writes data in synchronization with a clock signal. The DDR SDRAM and the DDR2 SDRAM output or write data in synchronization with a clock signal and a data strobe signal.

During the data I/O operation, the clock strobe signal of a memory controller of the SDRAM is toggled in the same period as the clock signal. That is, the clock strobe signal of the memory controller indicates a clock period of the memory controller.

Figure 5:
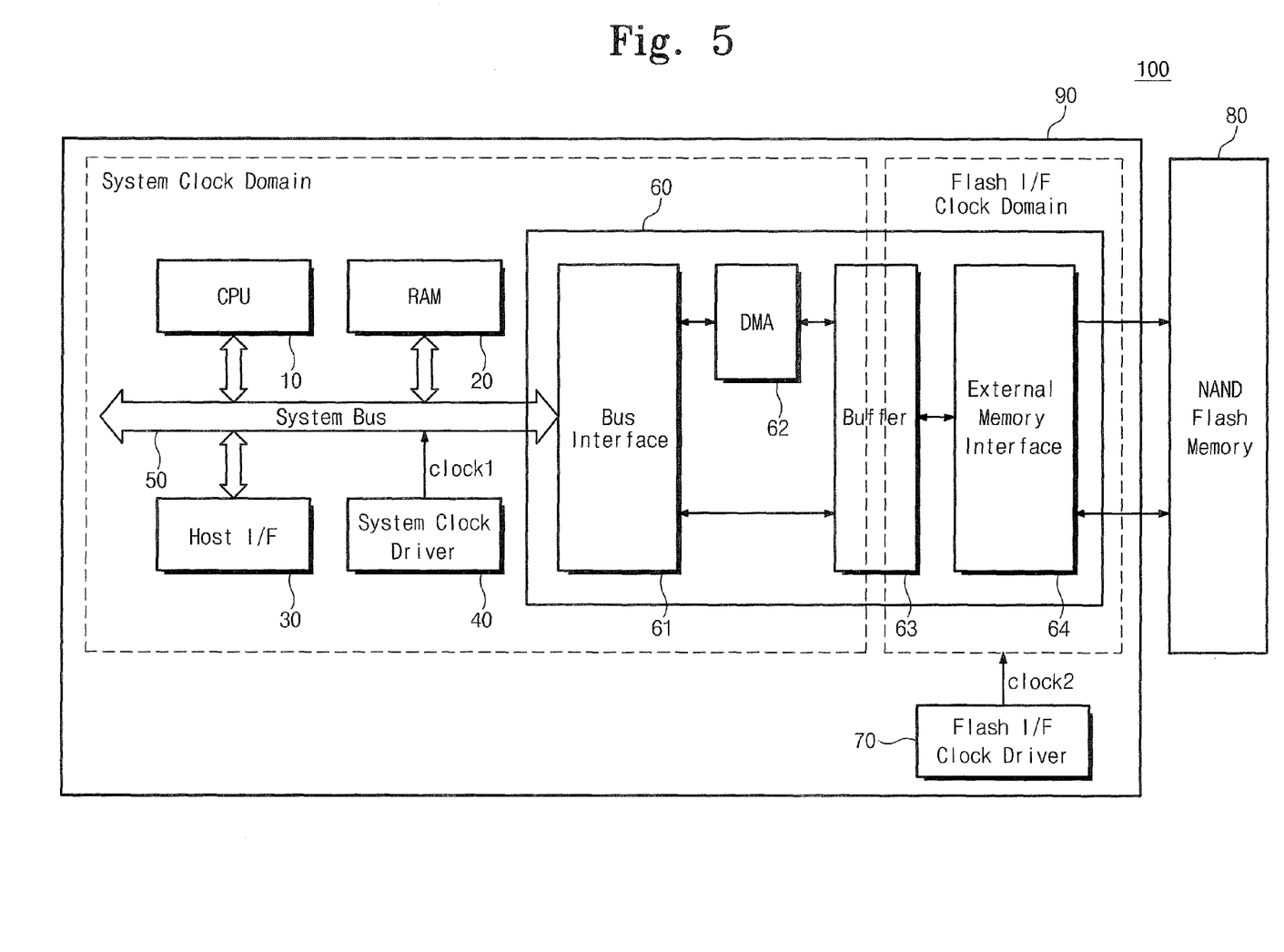
FIG. 5 is a block diagram of a memory controller in some embodiments according to the present invention.

FIG. 5 is a block diagram of a memory controller in some embodiments according to the invention. Referring to FIG. 5, a smart card 100 according to the present invention includes a memory controller 90 and a NAND flash memory 80. The memory controller 90 includes a central processing unit (CPU) 10, a RAM 20, a host interface (I/F) 30, a system clock driver 40, a system bus 50, a flash interface 60, and a flash interface clock driver 70. The flash interface 60 includes a bus interface 61, a direct memory access (DMA) 62, a buffer 63, and an external memory interface 64.

The CPU 10 transfers commands and signals for control of each of the blocks 20 to 60 via the system bus 50. The RAM 20 10 can temporarily store data requested from the CPU 10. The host interface 30 provides a protocol for data communication with a host system. The system clock driver 40 provides a first clock to the memory controller 90. The flash interface clock driver 70 provides a second clock to the buffer 63 and the external memory interface 64.

The bus interface 61 provides a protocol for data transmission to the system bus 50. Without intervention of the CPU 10, the DMA 62 directly accesses data of the NAND flash memory 80 via the external memory interface 64. The buffer 63 temporarily stores data from the CPU 10 or data from the NAND flash memory 80 in synchronization with the first clock or the second clock. The external memory interface 64 provides a protocol for data transmission to the NAND flash memory 80.

When the smart card 100 is connected to the host system, the CPU 10 generates a control signal synchronized with the first clock at the bus interface 61 in order to transfer data requested from the host system via the host interface 30.

The control signal is synchronized with the second clock at the external memory interface 64 and is transferred to the NAND flash memory 80. In response to the control signal, the NAND flash memory 80 transfers the data requested from the host system to the buffer 63 in synchronization with the second clock. The CPU 10 or the DMA 62 transfers data stored in the buffer 63 via the bus interface 61 to the host system in synchronization with the first clock.

That is, the external memory interface 64 and the buffer 63 operates in synchronization with the second clock, while the other blocks 10 to 30 of the memory controller 90 operate in synchronization with the first clock of the system clock driver 40.

Without exposing a system clock (i.e., the first clock) to the external flash memory 80, the memory controller 90 of the present invention transfers data in synchronization with the second clock using the buffer 63, thereby preventing exposure of the system clock. In other words, in some embodiments according to the invention, the clock used for key operation processing is separate from a clock signal used for interface to the nonvolatile memory system. In particular, data transferred to/from the nonvolatile memory can be stored in a buffer circuit according to the separate clock signals. For example, when data is written from the CPU to the nonvolatile memory, the data is first stored in the buffer circuit using the first clock signal (which is to be protected) wherein after the data is read from the buffer circuit and written to the nonvolatile memory using the second clock signal. Similarly, when data is read from the nonvolatile memory system, the second clock signal is used to transfer the data into the buffer circuit whereas the first clock signal is used to read the data from the buffer circuit for transfer by the CPU. Accordingly, the first clock signal used for key processing operations can be protected from observation by using the second clock signal for operations to/from the nonvolatile memory (which may be observed).

The memory controller of the present invention can be applied not only to NAND flash memories but also to SDRAMs, DDR SDRAMs, and DDR2 SDRAMs.

Figure 6:
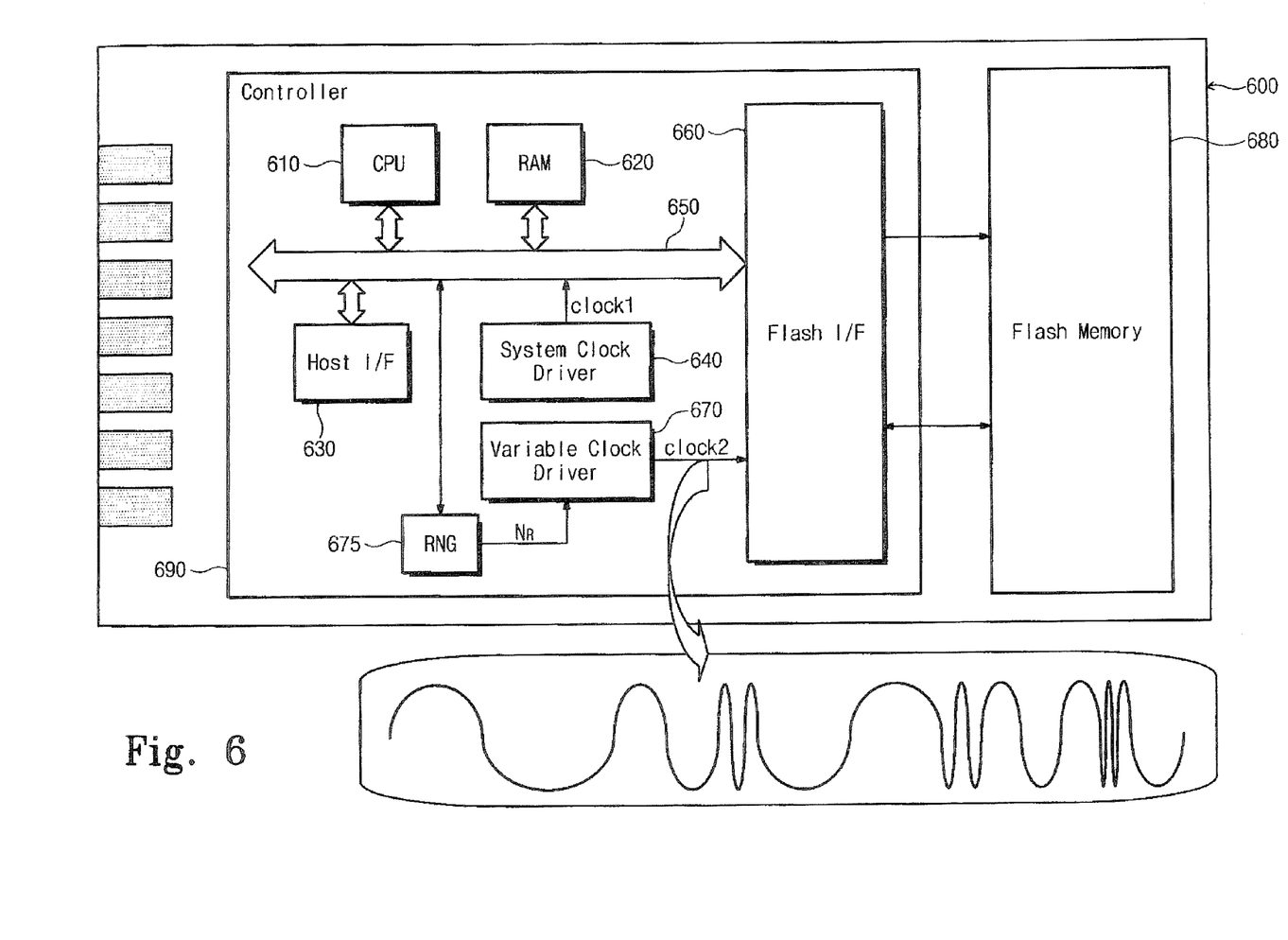
FIG. 6 is a block diagram of a memory controller in some embodiments according to the present invention.

FIG. 6 is a block diagram of a memory controller according to another embodiment of the present invention. A smart card 600 of FIG. 6 is similar in structure to the smart card 100 of FIG. 5, and thus the overlapping descriptions will be omitted for conciseness.

Referring to FIG. 6, when compared to the memory controller 90 of FIG. 5, a memory controller 690 further includes a random number generator (RNG) 675 and a variable clock driver 670 where the period of a second clock of a flash interface 660 is random.

The random number generator 675 generates a random number $N_R$, and the variable clock driver 670 receives the random number $N_R$ to generate the second clock with a random clock period.

The flash interface 660 performs data communication with a flash memory 680 in synchronization with the second clock. For example, the flash interface 660 includes a buffer (not illustrated) for synchronization of a control signal with a first clock and the second clock.

When the smart card 600 is connected to a host system, a CPU 610 or a DMA (not illustrated) generates a control signal synchronized with the first clock via the flash interface 660 in order to transfer data requested from the host system via a host interface 630. The flash interface 660 receives a control signal from the CPU 610 or the DMA and transfers the received control signal to the flash memory 680 in synchronization with the second clock. In response to the control signal, the flash memory 680 transfers the data requested from the host system to the buffer in synchronization with the second clock. The CPU 610 transfers the data stored in the buffer to the host system via the host interface 630 in synchronization with the first clock.

That is, the minimum period of the second clock is set to satisfy a timing margin for transferring a control signal stored in the buffer via the flash interface 660 and receiving data at the buffer from the flash memory 680. Accordingly, the second clock signal (used for transfers to/from the nonvolatile memory system) can be sufficiently independent of the first clock signal by using a random number generator as a basis for the generation of the second clock signal (which may be observed).

Without exposing the system clock (i.e., the first clock) to an external NAND flash memory 680, the memory controller 690 of the present invention transfers data in synchronization with the second clock with a random period using the buffer 63, thereby preventing exposure of the system clock.

The memory controllers according to the present invention can be applied to memory cards such as SIM cards and smart cards.

As described above, the memory controller according to the present invention does not expose the system clock, thereby making it possible to prevent a possible power analysis attack and to increase the security level of the smart card mounted with the memory controller.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed:

1. A memory controller for a smart card including a non-volatile memory, comprising:

an internal circuit configured to perform cryptographic key processing responsive to a first clock; and a non-volatile memory interface circuit for transferring/receiving a signal to/from the internal circuit in synchronization with the first clock and transferring/receiving the signal to/from an external device in synchronization with a second clock that is asynchronous relative to the first clock, wherein the second clock has a variable period, wherein a minimum period of the second clock with a variable period is set to provide timing margin for transferring a control signal stored in a buffer circuit via the non-volatile memory interface circuit and receiving data at the buffer from the external device.

2. The memory controller of claim 1, wherein the signal includes a control signal and data.

3. The memory controller of claim 1, wherein the external device comprises a memory.

4. The memory controller of claim 1, wherein the second clock is generated based on a pseudo-random number.

5. A memory controller comprising:

a memory; and a controller for controlling the memory, the controller comprising:

an internal circuit configured to perform cryptographic key processing in synchronization with a first clock; and a non-volatile memory interface circuit for transferring/receiving a signal to/from the internal circuit in synchronization with the first clock and transferring/receiving the signal to/from an external device in synchronization with a second clock that is asynchronous relative to the first clock, wherein the second clock has a variable period, wherein a minimum period of the second clock with a variable period is set to satisfy timing margin for transferring a control signal stored in a buffer via an external memory interface and receiving data at the buffer from an external memory.

6. The memory controller of claim 5, wherein the second clock is based on a pseudo-random number.

7. A memory controller comprising:

a first clock;

a second clock asynchronous relative to the first clock;

an internal circuit configured to perform cryptographic key processing in synchronization with the first clock; and a buffer configured to store a control signal of the memory controller in synchronization with the first clock and configured to transfer the control signal to an external memory in synchronization with the second clock and configured to receive/store data from the external memory in synchronization with the second clock, wherein the second clock has a variable period, wherein a minimum period of the second clock with a variable period is set to satisfy timing margin for transferring the control signal stored in the buffer via the external memory interface and receiving the data at the buffer from the external memory.

8. The memory controller of claim 7, wherein the first clock comprises a system clock of the memory controller.

9. The memory controller of claim 7, wherein the second clock is synchronized with an external memory interface.

10. The memory controller of claim 7, wherein the second clock is based on a pseudo-random number.

11. The memory controller of claim 7, wherein the data stored in the buffer is transferred a DMA and/or a processor of the memory controller in synchronization with the first clock.

12. The memory controller of claim 7, further comprising an external memory interface block configured to interface with the external memory.

13. The memory controller of claim 7, further comprising a bus interface block configured to interface with a system bus.

14. The memory controller of claim 7, further comprising a host interface block configured to interface with a host system.

15. The memory controller of claim 14, wherein the host system receives the data stored in the buffer in synchronization with the first clock.

16. A method for transferring data via a memory controller in a smart card including a non-volatile memory, comprising:
   storing a control signal of the memory controller in a buffer in synchronization with a first clock used for cryptographic key processing;
   transferring the control signal stored in the buffer to an external memory in synchronization with a second clock that is asynchronous relative to the first clock; and
   storing data to/from the external memory in the buffer in synchronization with the second clock, wherein the second clock has a variable period.

17. The method of claim 16, further comprising:
   transferring the data stored in the buffer to a system bus in synchronization with the first clock.

18. The method of claim 16, further comprising transferring the data stored in the buffer to a host system via a system bus in synchronization with the first clock.

19. The method of claim 16, wherein the first clock is a system clock of the memory controller.

20. The method of claim 16, wherein a minimum period of the second clock with a variable period is set to satisfy timing margin for transferring the control signal stored in the buffer via an external memory interface and receiving the data at the buffer from the external memory.

21. The method of claim 16, wherein the second clock is based on a pseudo-random number.

22. The method of claim 16, wherein the data stored in the buffer is transferred to a DMA and/or a processor circuit of the memory controller in synchronization with the first clock.

* * * * *